(12) United States Patent
Satou et al.

(10) Patent No.: US 6,510,038 B1
(45) Date of Patent: Jan. 21, 2003

(54) HIGH-VOLTAGE FEEDTHROUGH CAPACITOR

(75) Inventors: Tukasa Satou, Akita (JP); Isao Fujiwara, Akita (JP); Setsuo Sasaki, Akita (JP)

(73) Assignee: TDK Corporation, Tokyo (JP)

( * ) Notice: Subject to any disclaimer, the term of this patent is extended or adjusted under 35 U.S.C. 154(b) by 660 days.

(21) Appl. No.: 08/972,968

(22) Filed: Nov. 19, 1997

(30) Foreign Application Priority Data

Nov. 19, 1996 (JP) ..................................... HEI 8-308541

(51) Int. Cl.$^7$ ................................................. H01G 4/42
(52) U.S. Cl. ..................... 361/302; 361/303; 361/306.1
(58) Field of Search ........................... 361/301.1, 301.2, 361/301.3, 302, 303, 305, 307, 306.1, 309, 311, 321.1

(56) References Cited

U.S. PATENT DOCUMENTS

| | | | | |
|---|---|---|---|---|
| 3,683,245 A | * | 8/1972 | Bacher et al. ............ | 361/306.1 |
| 4,768,129 A | * | 8/1988 | Sasaki et al. ................ | 361/302 |
| 4,811,161 A | * | 3/1989 | Sasaki et al. ................ | 361/302 |
| 5,032,949 A | * | 7/1991 | Sasaki et al. ................ | 361/302 |
| 5,040,091 A | * | 8/1991 | Yamaoka et al. ............ | 361/302 |
| 5,113,309 A | * | 5/1992 | Sasaki et al. ................ | 361/302 |
| 5,544,002 A | * | 8/1996 | Iwaya et al. ................. | 361/302 |
| 5,600,531 A | * | 2/1997 | Jun ............................. | 361/302 |
| 5,729,425 A | * | 3/1998 | Fugiwara et al. ........... | 361/345 |

FOREIGN PATENT DOCUMENTS

| | | | |
|---|---|---|---|
| JP | 5-198943 | 8/1993 | ............ H05K/3/40 |
| JP | 7-15129 | 4/1995 | |

* cited by examiner

*Primary Examiner*—Dean A. Reichard
*Assistant Examiner*—Eric Thomas
(74) *Attorney, Agent, or Firm*—Oblon, Spivak, McClelland, Maier & Neustadt, P.C.

(57) ABSTRACT

In a high-voltage feedthrough capacitor, a grounding member has two through-holes spaced away from each other. Feedthrough capacitors each has one central conductor, a dielectric layer, and an electrode. The periphery of the central conductor is respectively covered with the dielectric layer, and the surface of the dielectric layer is respectively covered with the electrode. The feedthrough capacitor extends respectively through the through-hole, and has been fitted to the grounding member. The electrode has been bonded to the grounding member. An armoring insulator covers the peripheries of the feedthrough capacitors and the periphery of the grounding member.

8 Claims, 7 Drawing Sheets

HIGH-VOLTAGE FEEDTHROUGH CAPACITOR

BACKGROUND OF THE INVENTION

1. Field of the Invention

The present invention relates to a high-voltage feedthrough capacitor for use, e.g., in a magnetron for an microwave oven for the prevention of undesired radiation noise.

2. Description of the Related Art

Various high-voltage feedthrough capacitors of this kind have been proposed and put to practical use. For example, Examined Japanese Utility Model Publication No. Hei. 7-15129 discloses a high-voltage feedthrough capacitor which employs a central conductor constituted of simple parallel flat plates wherein a longitudinally central part thereof serves as an electrode for the central conductor, and which has an electrode part facing the electrode for the central conductor and formed by processing part of a grounding plate. In this capacitor, the dielectric member disposed between the pair of electrodes is a thermosetting resin casting united with the electrodes and serving also as a filler. This dielectric member is molded by injection molding.

One problem of the conventional one described above is that since the pair of electrodes, which generate a capacitance, are constituted of a part of the grounding plate and a part of the central conductor, the area of the electrodes is influenced by the shape of the high-voltage feedthrough capacitor and cannot be increased. It has hence been difficult to secure a high capacitance by increasing the area of the electrodes and to obtain improved filter properties.

Another problem is that, if a high-permittivity material is incorporated into the thermosetting resin to be used for constituting the dielectric member between the electrodes in order to increase the permittivity of the dielectric member, the resultant thermosetting resin has impaired moldability, resulting in a reduced yield. This means that there is a limitation on obtaining an increased capacitance and thus improving filter properties, while securing moldability.

Still another problem is that since the dielectric member disposed between the electrodes serves also as a filler, it is impossible to use two resin materials having different functions in such different ways that a high-permittivity resin is used as a capacitor part and a resin having an ordinary permittivity is used as a filler. It is therefore difficult to optimize the two functions.

SUMMARY OF THE INVENTION

It is an object of the present invention to provide a high-voltage feedthrough capacitor suitable for use as a filter capacitor for preventing undesired radiation noise in a magnetron for an microwave oven.

It is another object of the present invention to provide a high-voltage feedthrough capacitor which is capable of securing a high capacitance irrespective of the shape thereof as a whole.

It is still another object of the present invention to provide a high-voltage feedthrough capacitor which has a high capacitance and is capable of improving filter properties, while securing moldability.

It is further object of the present invention to provide a high-voltage feedthrough capacitor in which resin materials having different functions can be used in such different ways that a high-permittivity resin is used as a capacitor part and a resin suitable for armoring is used as an armoring insulator.

The high-voltage feedthrough capacitor of the present invention comprises a grounding member, two feedthrough capacitors, and an armoring insulator. The grounding member has two through-holes spaced away from each other. The feedthrough capacitors each comprises one central conductor, a dielectric layer, and an electrode. The periphery of the central conductor is covered with the dielectric layer, while the surface of the dielectric layer is covered with the electrode. The feedthrough capacitors each extends through the through-hole and are fitted to the grounding member, and each electrode is bonded to the grounding member. The armoring insulator covers the peripheries of the feedthrough capacitors and the periphery of the grounding member.

In the high-voltage feedthrough capacitor of the present invention, the two feedthrough capacitors extend through the respective through-holes formed in the grounding member and are fitted to the grounding member, while the armoring insulator covers the peripheries of the feedthrough capacitors and the periphery of the grounding member. According to this structure, the high-voltage feedthrough capacitor in which both feedthrough capacitors are connected to a magnetron for an microwave oven can be used as a filter capacitor for the prevention of undesired radiation noise. In addition, the high-voltage feedthrough capacitor can have excellent electrical insulating properties and excellent moisture resistance.

In each of the feedthrough capacitors, the periphery of the central conductor is covered with the dielectric layer whose surface is covered with the electrode. The feedthrough capacitors of this structure can secure a satisfactory capacitance between each central conductor and the corresponding electrode, the capacitance being determined by the permittivity and thickness of each dielectric layer and by the area of that part of each central conductor which faces the electrode. Consequently, a high capacitance can be secured, irrespective of the shape of the high-voltage feedthrough capacitor itself, by suitably selecting those aforementioned factors in the feedthrough capacitors which govern capacitance.

The feedthrough capacitors each has been fitted to the grounding member, while the armoring insulator covers the peripheries of the feedthrough capacitors and the periphery of the grounding member. According to this structure, a material which has excellent moldability and is different from the material of the dielectric layer as a component of each feedthrough capacitor can be used to form the armoring insulator so as to cover the peripheries of the feedthrough capacitors and the periphery of the grounding member therewith. Consequently, a high capacitance can be obtained without sacrificing moldability, whereby a high-voltage feedthrough capacitor having excellent filter properties can be obtained.

Furthermore, since the dielectric layer of each feedthrough capacitor and the armoring insulator are separate components, materials having different functions can be used in such different ways that a resin having high permittivity is used as the dielectric layer of each feedthrough capacitor and a resin suitable for armoring is used as the armoring insulator.

PREFERRED EMBODIMENT OF THE INVENTION

Preferred embodiment according to the present invention will be described as follows referring to the accompanying drawings.

Figure 1:
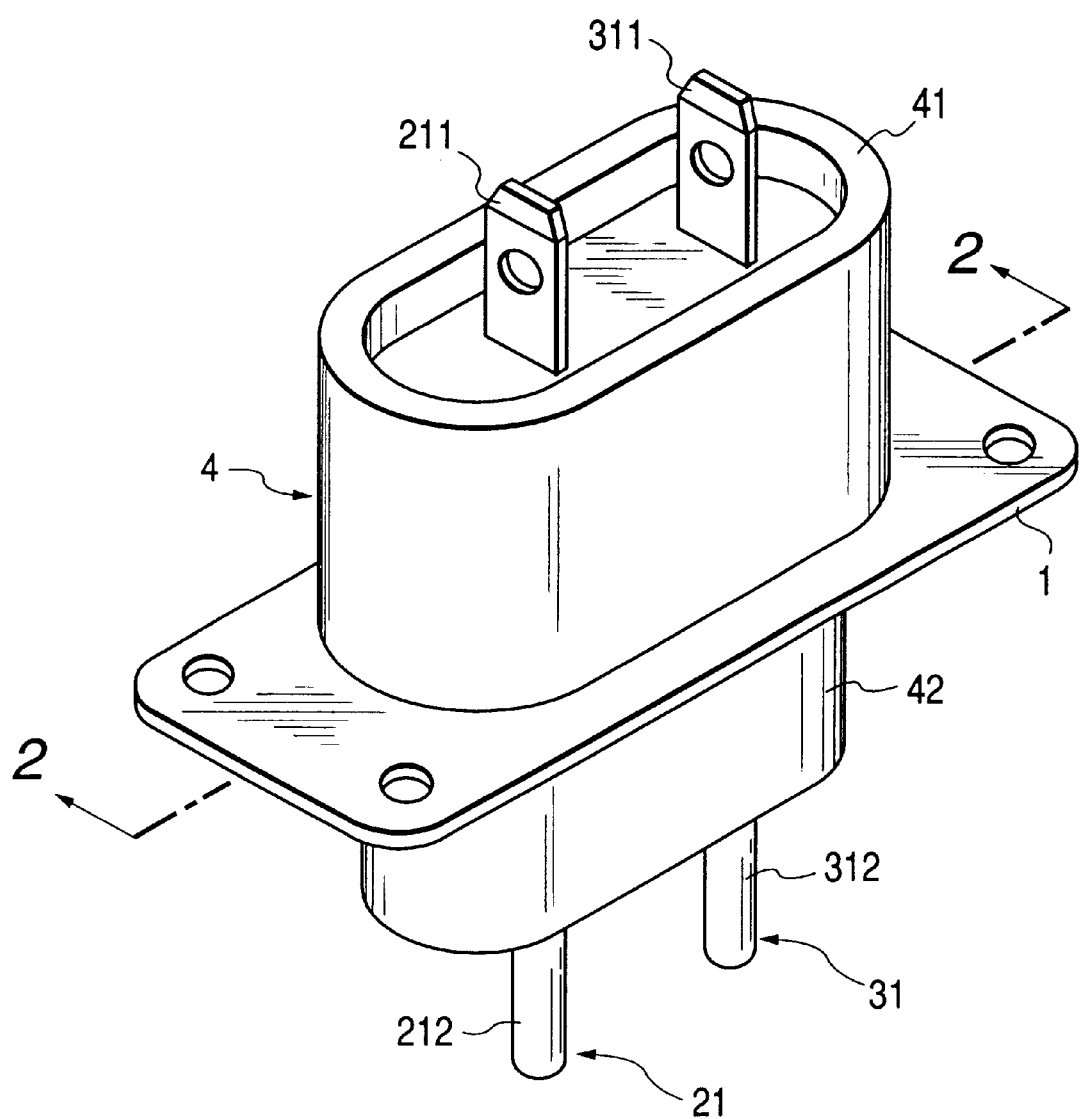
FIG. 1 is a perspective view illustrating one embodiment of the high-voltage feedthrough capacitor according to the present invention.
Figure 2:
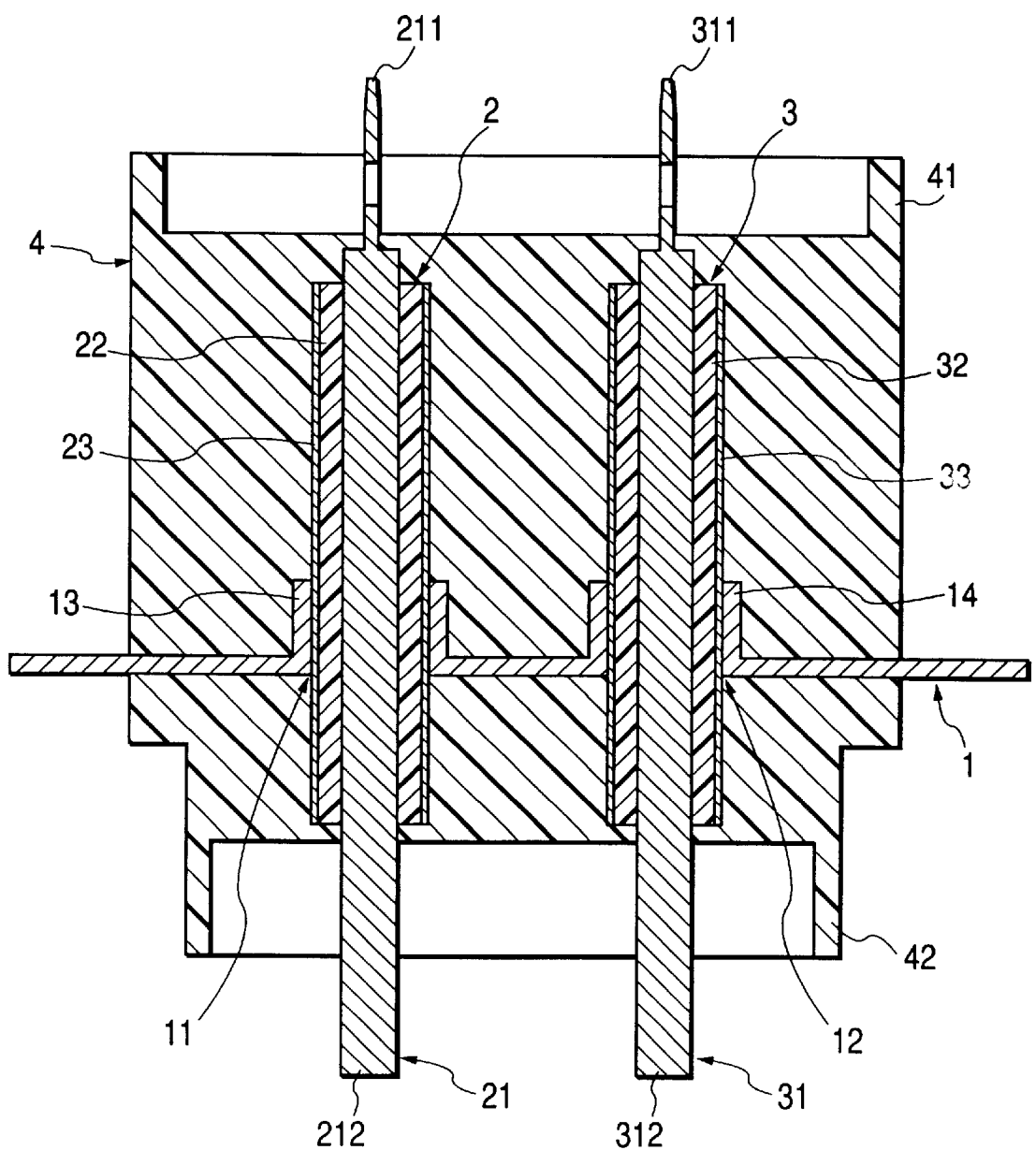
FIG. 2 is a sectional view taken on the line 2—2 of FIG. 1.

FIG. 1 is a perspective view of a high-voltage feedthrough capacitor according to the present invention. FIG. 2 is a sectional view taken on the line 2—2 of FIG. 1. The high-voltage feedthrough capacitor shown has a grounding member 1, two feedthrough capacitors 2, 31 and an armoring insulator 4. The grounding member 1 has two through-holes 11, 12 spaced away from each other.

The feedthrough capacitor 2 includes one central conductor 21, a dielectric layer 22, and an electrode 23. The periphery of the central conductor 21 is covered with the dielectric layer 22, and the surface of the dielectric layer 22 is covered with the electrode 23. The feedthrough capacitor 2 extends through the through-hole 11, and is fitted to the grounding member 1. The electrode 23 of the capacitor 2 is bonded to the grounding member 1 by means of, e.g., soldering or contact bonding or a combination of both.

The feedthrough capacitor 3 likewise has one central conductor 31, a dielectric layer 32, and an electrode 33. The periphery of the central conductor 31 is covered with the dielectric layer 32, and the surface of the dielectric layer 32 is covered with the electrode 33. The feedthrough capacitor 3 extends through the through-hole 12, and is fitted to the grounding member 1. The electrode 33 of the capacitor 3 is bonded to the grounding member 1 by means of, e.g., soldering or contact bonding or a combination of both.

The central conductors 21, 31 each is constituted of a metallic material. The material of each of the dielectric layers 22, 32 can be a dielectric ceramic, a thermoplastic resin, a thermosetting resin etc. Among them, the thermoplastic resin is most preferable for the dielectric layers 22, 32. The electrodes 23, 33 each may be formed by applying a conductive paste and baking the same. Alternatively, a conductive resin can be used as an electrode material.

The armoring insulator 4 covers the feedthrough capacitors 2, 3 and the grounding member 1. The grounding member 1 is a plate-like metallic member, whose periphery projects from the armoring insulator 4. The plate-like metallic member is consists of steel on which materials such as, Cu, Cr, Sn are plated.

In this high-voltage feedthrough capacitor according to the present invention, the two feedthrough capacitors 2, 3 extend through the respective through-holes 11, 12 formed in the grounding member 1 and are fitted to the grounding member 1, while the armoring insulator 4 covers the peripheries of the feedthrough capacitors 2, 3 and the periphery of the grounding member 1. According to this structure, the high-voltage feedthrough capacitor in which both feedthrough capacitors 2, 3 are connected to a magnetron for an microwave oven can be used as a filter capacitor for the prevention of undesired radiation noise. In addition, the high-voltage feedthrough capacitor can have excellent electrical insulating properties and excellent moisture resistance.

In the feedthrough capacitors 2, 3, the peripheries of the central conductors 21, 31 are respectively covered with the dielectric layers 22, 32, whose surfaces are respectively covered with the electrodes 22, 33. The feedthrough capacitors 2, 3 of this structure can secure a satisfactory capacitance between the central conductors 21, 31 and the electrodes 22, 33, the capacitance being determined by the permittivity and thickness of each of the dielectric layers 22, 32 and by the area of those parts of the central conductors 21, 31 which face the electrodes 22, 33. Consequently, a high capacitance can be secured, irrespective of the shape of the high-voltage feedthrough capacitor itself, by suitably selecting those aforementioned factors in the feedthrough capacitors 2, 3 which govern capacitance.

The feedthrough capacitors 2, 3 extend respectively through the through-holes 11, 12 formed in the grounding member 1 and are fitted to the grounding member 1, while the armoring insulator 4 covers the peripheries of the feedthrough capacitors 2, 3 and the periphery of the grounding member 1. According to this structure, a material which is excellent in insulating properties and moldability and is different from the material of the dielectric layers 22, 32 as components of the feedthrough capacitors 2, 3 can be used to form the armoring insulator 4 to cover the peripheries of the feedthrough capacitors 2, 3 and the periphery of the grounding member 1 therewith. Consequently, a high capacitance can be obtained without sacrificing moldability, whereby a high-voltage feedthrough capacitor having excellent filter properties can be obtained.

Furthermore, since the dielectric layers 22, 32 of the feedthrough capacitors 2, 3 and the armoring insulator 4 are separate components, materials having different functions can be used in such different ways that a resin having high permittivity is used as the dielectric layers 22, 32 of the feedthrough capacitors 2, 3 and a resin suitable for armoring, e.g., a resin satisfactory in moldability, arc resistance, and tracking resistance, is used as the armoring insulator 4.

In the above embodiment, the dielectric layers 22, 32 each is made of an insulating thermoplastic resin, and the central conductors 21, 31 are united with the dielectric layers 22, 32, respectively. The dielectric layers 22, 32 each is desirably constituted of a resin having a relative permittivity of 10 or higher.

In this case, the electrodes 22, 33 each is preferably constituted of a conductive thermoplastic resin. An example thereof is DURACON EB-10 (Acetal Co-Polymer), manufactured by Polyplastics Co., Ltd., Japan. In the case where the electrodes 22, 33 each is constituted of a conductive thermoplastic resin, the grounding member 1 desirably has sidewall parts 13, 14. These sidewall parts 13, 14 serve to increase the contact area between the electrode 23 and the grounding member 1 and that between the electrode 33 and the ground member 1 in the feedthrough capacitors 2, 3, whereby the strength of bonding and adhesion of the feedthrough capacitors 2, 3 to the grounding member 1 can be enhanced.

The armoring insulator 4 is desirably made of an insulating thermoplastic resin. A usable example thereof is DURANEX J444A (Polybutylene Terephthalete), manufactured by Polyplastics Co., Ltd.

When the dielectric layers 22, 32 are constituted of a thermoplastic resin, the electrodes 22, 33 are constituted of a conductive thermoplastic resin, and the armoring insulator 4 is constituted of a thermoplastic resin, then the high-voltage feedthrough capacitor has improved reliability. This is because these components have coefficients of thermal expansion which are close to one another and, hence, the thermal stress imposed on the high-voltage feedthrough capacitor is alleviated.

In the feedthrough capacitors 2, 3, both ends of each of the central conductors 21, 31 project from the armoring insulator 4. The projecting conductor ends on one side respectively constitute connecting tab parts 211 and 311, while those on the other side respectively constitute choke coil connection side parts 212, 312.

The armoring insulator 4 covers the whole feedthrough capacitors 2, 3 excluding the connecting tab parts 211 and 311 and choke coil connection side parts 212, 312. The armoring insulator 4 has a ring-form projecting part 41 surrounding the connecting tab parts 211 and 311 and a ring-form projecting part 42 surrounding the choke coil connection side parts 212, 312. The ring-form projecting parts 41 and 42 are intended to secure a sufficient creepage distance for insulation.

An example of the embodiment described above was produced as follows. Feedthrough capacitors 2, 3 were obtained by forming dielectric layers 22, 32 about 20 mm long and about 1 mm thick respectively on the peripheries of central conductors 21, 31 about 3 mm thick made of a metallic material, applying a conductive paste to the dielectric layers 22, 32, and baking the paste to form electrodes 22, 33. The dielectric layers 22, 32 were obtained by integrally molding SUMICON FM-E209D (Poly Phenylene Sulfide) ($\epsilon_s \approx 13$), manufactured by Sumitomo Bakelite Co., Ltd., Japan, together with the central conductors 21, 31. The feedthrough capacitors 2, 3 thus obtained had a capacitance around 60 pF. Any desired value of capacitance is obtained by changing the diameter of the central conductors 21, 31 and the length of the dielectric layers 22, 32. On the other hand, a conventional high-voltage feedthrough capacitor disclosed in Examined Japanese Utility Model Publication No. Hei. 7-15129, which was prepared in the same size as the example, had a capacitance merely around 5 pF.

Figure 3:
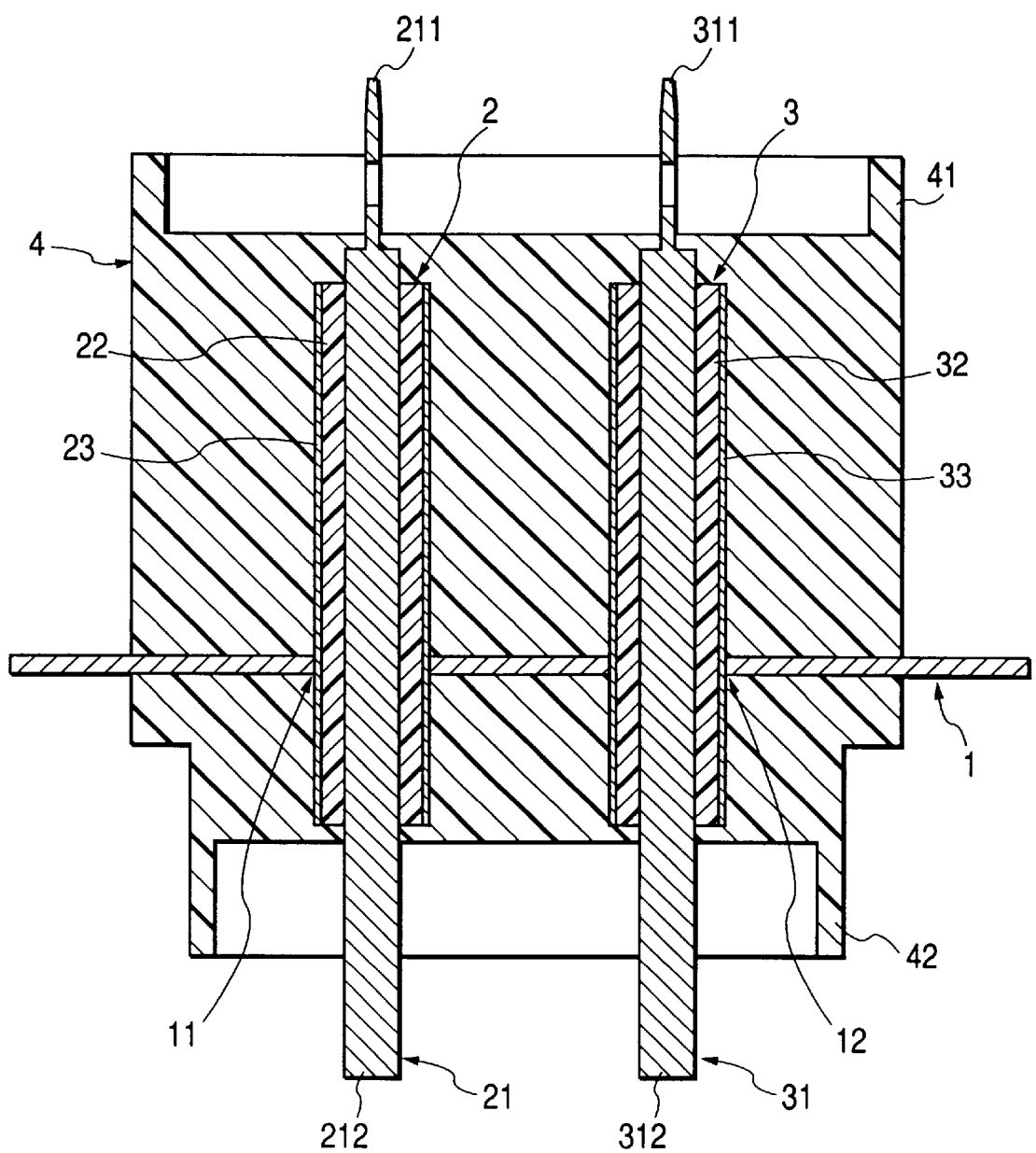
FIG. 3 is a sectional view illustrating another embodiment of the high-voltage feedthrough capacitor according to the present invention.

FIG. 3 is a sectional view illustrating another embodiment of the high-voltage feedthrough capacitor according to the present invention. In this drawing and FIGS. 1 and 2, the same components are designated by the same reference numerals. Explanations on these same components are omitted here. In this embodiment, the grounding member 1 does not have sidewall parts around the through-holes 11, 12, and is flat as a whole.

Figure 4:
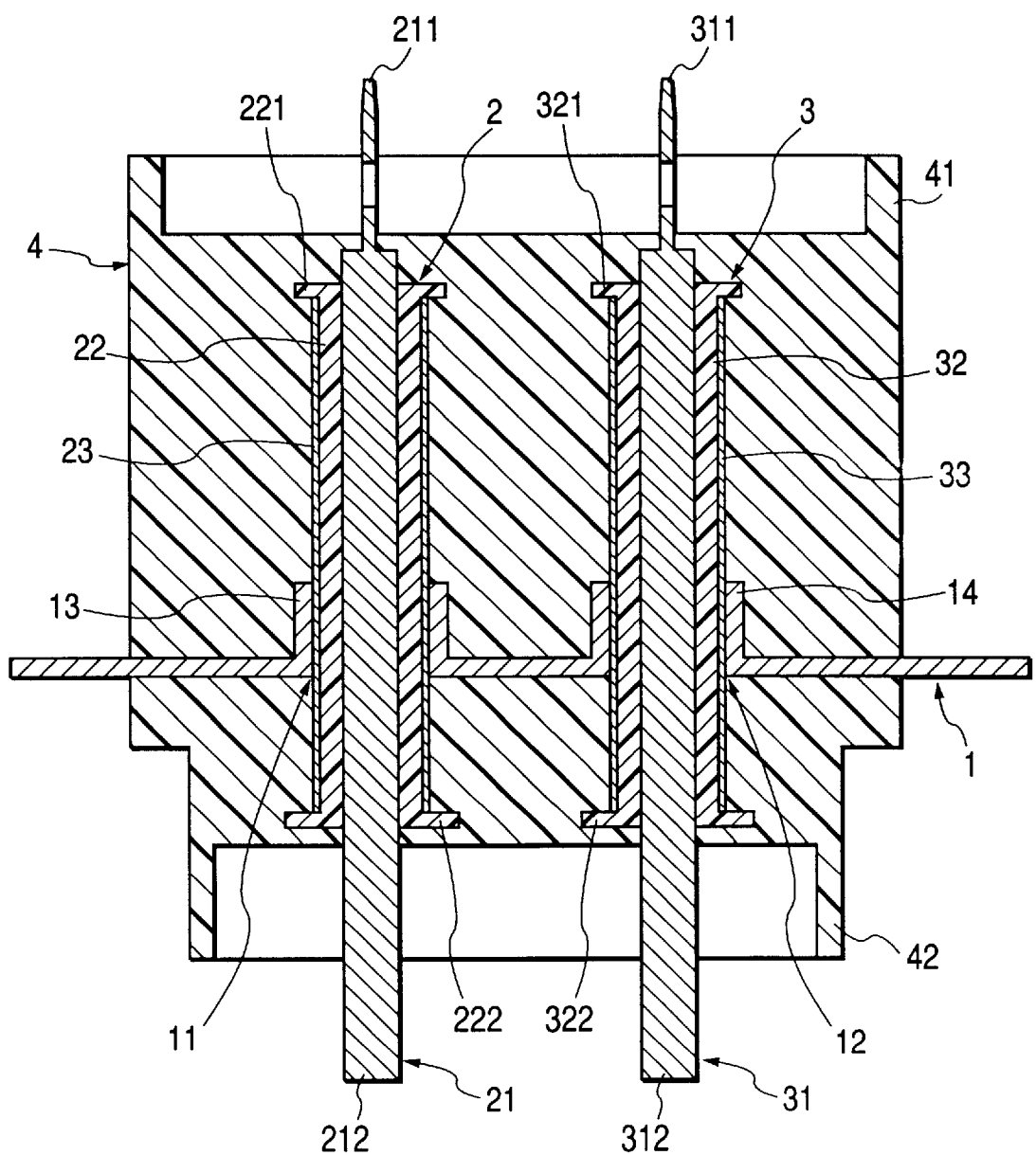
FIG. 4 is a sectional view illustrating still another embodiment of the high-voltage feedthrough capacitor according to the present invention.

FIG. 4 is a sectional view illustrating still another embodiment of the high-voltage feedthrough capacitor according to the present invention. In this drawing and FIGS. 1 to 3, the same components are designated by the same reference numerals. Explanations on these same components are omitted here. In this embodiment, the dielectric layer 22 has projecting parts 221, 222 respectively at both ends thereof. Likewise, the dielectric layer 32 has projecting parts 321, 322 respectively at both ends thereof. The projecting parts (221, 222) and (321, 322) are effective in preventing dielectric breakdown from occurring between each end of the electrode 23 and the central conductor 21 at the interface between the dielectric layer 22 and the armoring insulator 4, and in preventing dielectric breakdown from occurring between each end of the electrode 33 and the central conductor 22 at the interface between the dielectric layer 32 and the armoring insulator 4.

Figure 5:
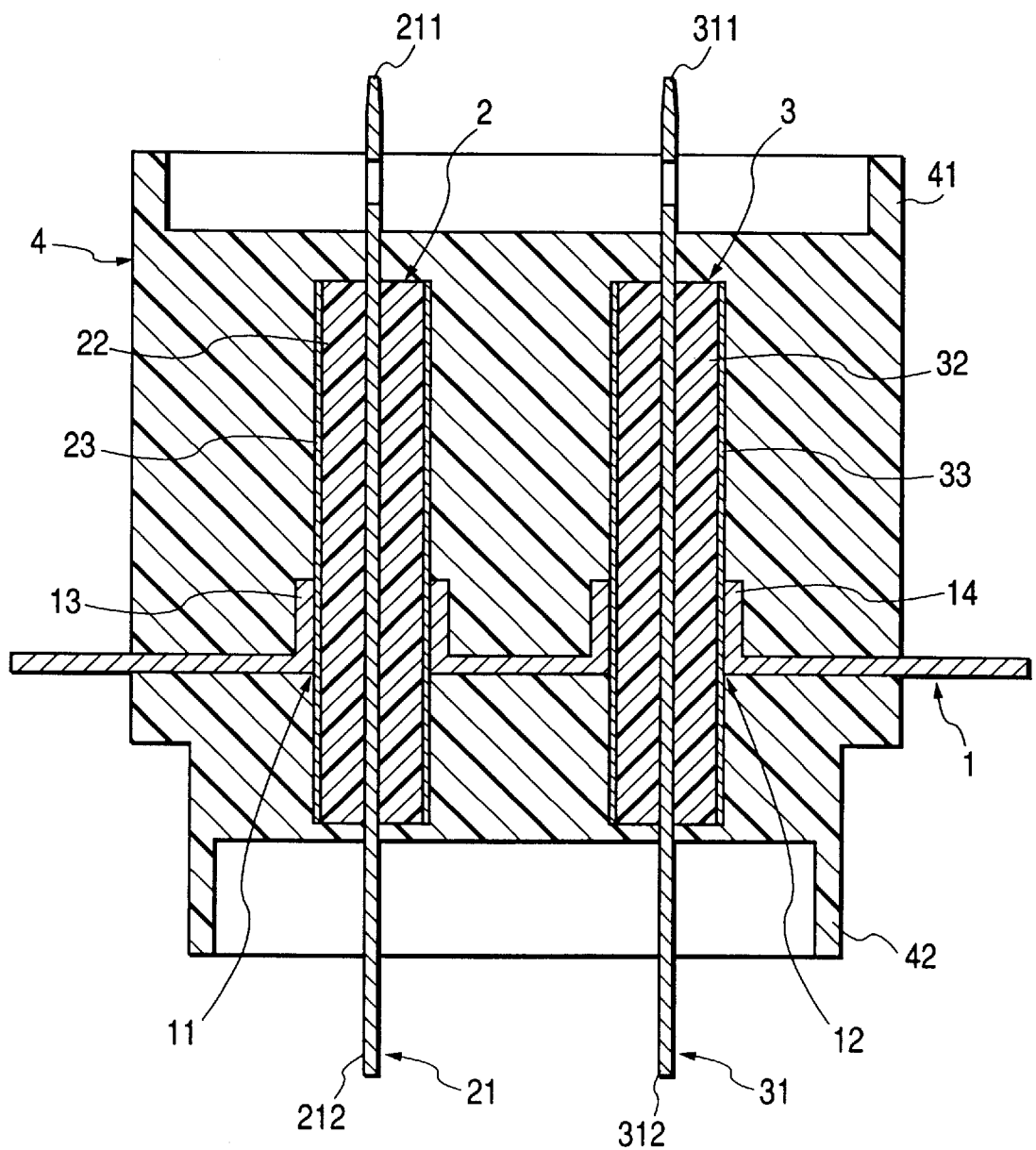
FIG. 5 is a sectional view illustrating a further embodiment of the high-voltage feedthrough capacitor according to the present invention.

FIG. 5 is a sectional view illustrating a further embodiment of the high-voltage feedthrough capacitor according to the present invention. This embodiment corresponds to that shown in FIGS. 1 and 2. In this drawing and FIGS. 1 and 2, the same components are designated by the same reference numerals. The embodiment shown in FIG. 5 differs from that shown in FIGS. 1 and 2 in that the central conductors 21, 31 each consists of a metallic plate material of a simple flat shape.

Figure 6:
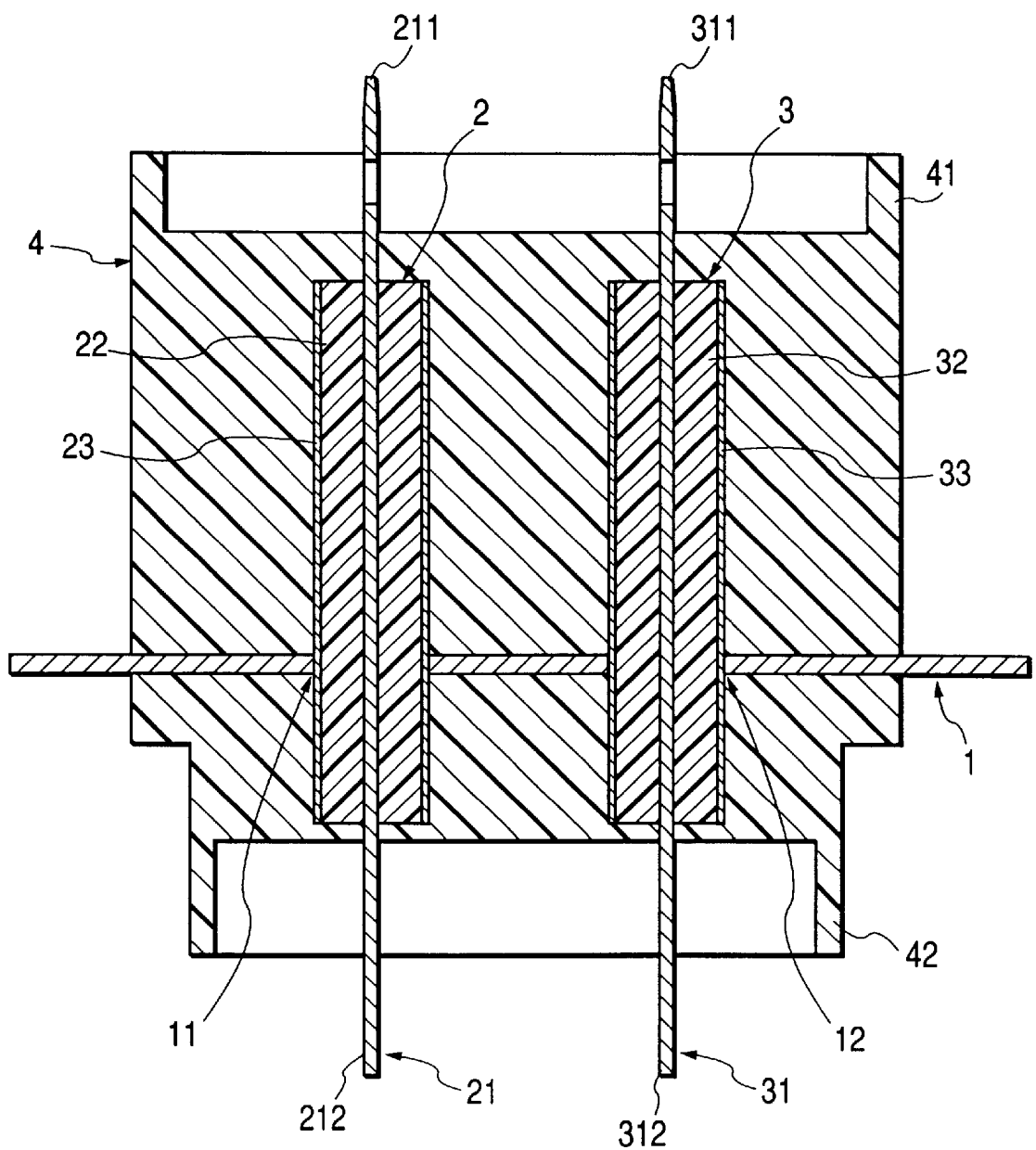
FIG. 6 is a sectional view illustrating still a further embodiment of the high-voltage feedthrough capacitor according to the present invention.

FIG. 6 is a sectional view illustrating still a further embodiment of the high-voltage feedthrough capacitor according to the present invention. This embodiment corresponds to that shown in FIG. 3. In this drawing and FIG. 3, the same components are designated by the reference numerals. The embodiment shown in FIG. 6 differs from that shown in FIG. 3 in that the central conductors 21, 31 each consists of a metallic plate material of a simple flat shape.

Figure 7:
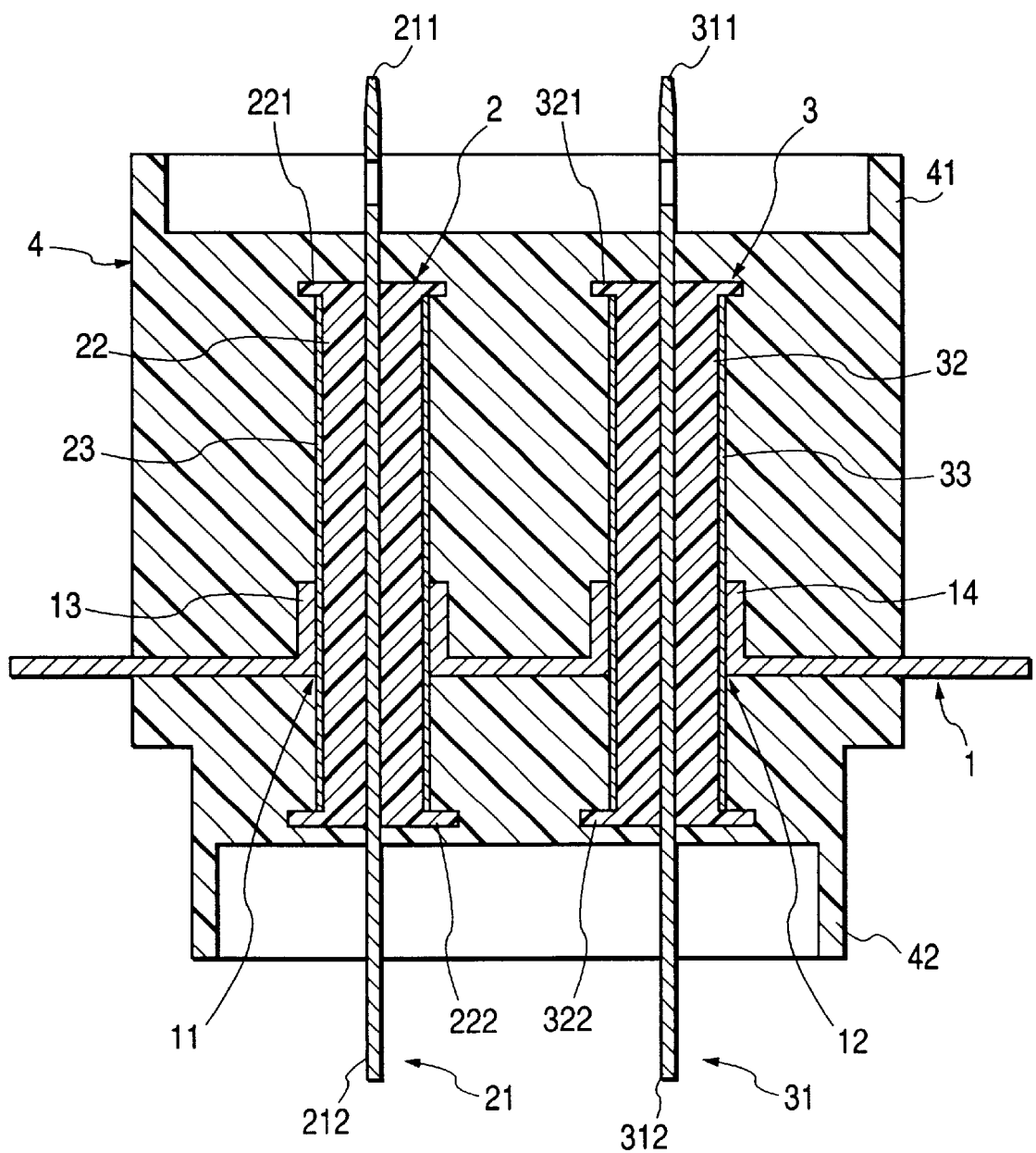
FIG. 7 is a sectional view illustrating still a further embodiment of the high-voltage feedthrough capacitor according to the present invention.

FIG. 7 is a sectional view illustrating still a further embodiment of the high-voltage feedthrough capacitor according to the present invention. This embodiment corresponds to that shown in FIG. 4. In this drawing and FIG. 4, the components are designated by the reference numerals. The embodiment shown in FIG. 7 differs from that shown in FIG. 4 in that the central conductors 21, 31 each consists of a metallic plate material of a simple flat shape.

As described above, the present invention brings about the following effects.

(a) A high-voltage feedthrough capacitor can be provided which is suitable for use as a filter capacitor for preventing undesired radiation noise in a magnetron for an microwave oven.

(b) A high-voltage feedthrough capacitor can be provided which is capable of securing a high capacitance irrespective of the shape thereof as a whole.

(c) A high-voltage feedthrough capacitor can be provided which has a high capacitance and is capable of improving filter properties, while securing moldability.

(d) A high-voltage feedthrough capacitor can be provided in which resin materials having different functions can be used in such different ways that a high-permittivity resin is used as a capacitor part and a resin suitable for armoring is used as an armoring insulator.

What is claimed is:

1. A high-voltage feedthrough capacitor comprising:
   a grounding member having two through-holes spaced away from each other;
   two feedthrough capacitor devices each comprising a central conductor, a dielectric layer, and an electrode, a periphery of said central conductor being covered with said dielectric layer, a surface of said dielectric layer being covered with said electrode, each of said feedthrough capacitor devices extending through a respective one of said through-holes and being fitted to said grounding member, each electrode being bonded to said grounding member; and
   an armoring insulator covering peripheries of said feedthrough capacitor devices and a periphery of said grounding member,
   wherein each of said two electrodes comprise a conductive thermoplastic resin, each of said dielectric layers further includes a projecting dielectric portion at one end thereof and respectively extending over said electrodes to prevent dielectric breakdown between said electrodes and said central conductors at an interface between said armoring insulator and said dielectric layers.

2. A high-voltage feedthrough capacitor according to claim 1, wherein said armoring insulator comprises a thermoplastic resin.

3. A high-voltage feedthrough capacitor according to claim 1, wherein both ends of said central conductor in each of said feed-through capacitor devices project from said armoring insulator, one of said projecting ends constituting a connecting tab part and another end constituting a choke coil connection side part; and said armoring insulator covers the whole of said feedthrough capacitor devices excluding said connecting tab parts and said choke coil connection side parts, and a ring-form projecting part surrounding said connecting tab parts and a ring-form projecting part surrounding said choke coil connection side parts.

4. A high-voltage feedthrough capacitor according to claim 1, wherein said grounding member has a sidewall part around each through-hole; and each of said electrodes is bonded to said sidewall part.

5. A high-voltage feedthrough capacitor according to claim 1, wherein each of said dielectric layers each comprises a thermoplastic resin.

6. A high-voltage feedthrough capacitor according to claim 5, wherein each of said central conductors are united with a respective one of said dielectric layers.

7. A high-voltage feedthrough capacitor according to claim 1, wherein each of said dielectric layers comprise a resin having a relative permittivity of 10 or higher.

8. A high-voltage feedthrough capacitor according to claim 1, which is for use in a magnetron for preventing undesired radiation noise.

* * * * *